United States Patent
Gonzalez et al.

(10) Patent No.: US 8,271,470 B2
(45) Date of Patent: Sep. 18, 2012

(54) AUTO-ACTIVATION OF FONTS

(75) Inventors: Julio Amable Gonzalez, San Jose, CA (US); Yosuke Kurita, San Jose, CA (US)

(73) Assignee: Apple Inc., Cupertino, CA (US)

( * ) Notice: Subject to any disclaimer, the term of this patent is extended or adjusted under 35 U.S.C. 154(b) by 903 days.

(21) Appl. No.: 11/904,780

(22) Filed: Sep. 28, 2007

(65) Prior Publication Data

US 2008/0306916 A1  Dec. 11, 2008

Related U.S. Application Data

(60) Provisional application No. 60/943,046, filed on Jun. 9, 2007.

(51) Int. Cl.
*G06F 17/30* (2006.01)

(52) U.S. Cl. .......................... 707/706; 345/170; 345/467

(58) Field of Classification Search ....... 707/3, E17.014, 707/999.3, 802, 706, 999.1, 999.003; 715/269, 715/467, 170
See application file for complete search history.

(56) References Cited

U.S. PATENT DOCUMENTS

| | | | | |
|---|---|---|---|---|
| 5,167,013 A * | 11/1992 | Hube et al. | ..................... | 358/1.11 |
| 5,361,332 A * | 11/1994 | Yoshida et al. | ................. | 358/1.15 |
| 5,410,640 A * | 4/1995 | Morikawa et al. | ............ | 358/1.11 |
| 5,524,181 A * | 6/1996 | Sung et al. | ....................... | 358/1.4 |
| 5,586,241 A * | 12/1996 | Bauermeister et al. | ........ | 345/467 |
| 5,586,242 A * | 12/1996 | McQueen et al. | ............. | 345/467 |
| 5,649,024 A * | 7/1997 | Goldsmith | ..................... | 382/170 |
| 5,689,724 A * | 11/1997 | Morgan et al. | ................. | 715/205 |
| 5,754,187 A * | 5/1998 | Ristow et al. | .................. | 345/469 |
| 5,781,714 A * | 7/1998 | Collins et al. | .................. | 345/471 |
| 5,835,098 A * | 11/1998 | Lipton | ........................... | 345/589 |
| 5,859,648 A * | 1/1999 | Moore et al. | ................... | 345/471 |
| 5,990,907 A | 11/1999 | Colletti | | |
| 6,012,071 A * | 1/2000 | Krishna et al. | ................. | 715/201 |
| 6,073,147 A * | 6/2000 | Chan et al. | ..................... | 715/234 |
| 6,073,148 A * | 6/2000 | Rowe et al. | ..................... | 715/205 |
| 6,111,654 A * | 8/2000 | Cartier et al. | ................. | 358/1.16 |
| 6,173,335 B1 * | 1/2001 | Culbert et al. | ................ | 719/310 |

(Continued)

FOREIGN PATENT DOCUMENTS

EP  0-797-142 B1 *  9/1997

(Continued)

OTHER PUBLICATIONS

Lo, Chi-Wing, et al., "CJK Character Handling on Internet for Thin Clients", Proc. of 19th International Conf. on Computer Processing of Oriental Languages Conference, Seoul, South Korea, May 14-16, 2001, pp. 160-165.*

(Continued)

*Primary Examiner* — Jean M Corrielus
(74) *Attorney, Agent, or Firm* — Schwegman Lundberg & Woessner, P.A.

(57) ABSTRACT

A method and an apparatus that search for font data associated with an electronic document in a system in response to a font request are described. A font search is automatically activated when a requested font is determined not yet registered in a system. As a result of the font search, a requested font may be registered into a system. If a font search cannot locate a requested font in local storages and remote systems, a replacement for the requested font is selected from registered fonts. A replacement font may be one of the registered fonts most similar to the requested font according to a similarity measurement based on font attributes.

25 Claims, 5 Drawing Sheets

U.S. PATENT DOCUMENTS

| | | | |
|---|---|---|---|
| 6,323,865 B1 | 11/2001 | Colletti | |
| 6,552,728 B1 * | 4/2003 | Moore et al. | 345/471 |
| 6,760,887 B1 * | 7/2004 | Taieb | 715/269 |
| 6,882,344 B1 * | 4/2005 | Hayes et al. | 345/467 |
| 6,975,412 B2 * | 12/2005 | Daniels et al. | 358/1.11 |
| 7,064,757 B1 * | 6/2006 | Opstad et al. | 345/467 |
| 7,155,672 B1 * | 12/2006 | Adler et al. | 715/210 |
| 7,197,706 B1 * | 3/2007 | Berson et al. | 715/234 |
| 7,548,325 B2 * | 6/2009 | Quach et al. | 358/1.11 |
| 7,583,393 B2 * | 9/2009 | Hodder et al. | 358/1.11 |
| 2002/0055960 A1 * | 5/2002 | Cooper et al. | 707/536 |
| 2002/0059250 A1 * | 5/2002 | Arai et al. | 707/10 |
| 2002/0159084 A1 * | 10/2002 | Daniels et al. | 358/1.11 |
| 2003/0002063 A1 * | 1/2003 | Oomura et al. | 358/1.11 |
| 2003/0030832 A1 * | 2/2003 | Lea | 358/1.13 |
| 2003/0142333 A1 * | 7/2003 | Nguyen et al. | 358/1.11 |
| 2004/0080766 A1 * | 4/2004 | Lester et al. | 358/1.11 |
| 2004/0177056 A1 * | 9/2004 | Davis et al. | 707/1 |
| 2005/0094172 A1 * | 5/2005 | Engelman et al. | 358/1.11 |
| 2005/0094173 A1 * | 5/2005 | Engelman et al. | 358/1.11 |
| 2005/0219598 A1 * | 10/2005 | Nguyen et al. | 358/1.13 |
| 2005/0270553 A1 * | 12/2005 | Kawara | 358/1.13 |
| 2006/0072136 A1 * | 4/2006 | Hodder et al. | 358/1.11 |
| 2006/0170684 A1 * | 8/2006 | Kobayashi et al. | 345/467 |
| 2006/0232588 A1 * | 10/2006 | Opstad et al. | 345/467 |
| 2006/0242577 A1 * | 10/2006 | Muhanna | 715/542 |
| 2006/0253395 A1 * | 11/2006 | Corbell | 705/50 |

FOREIGN PATENT DOCUMENTS

| | | |
|---|---|---|
| EP | 0-533-177 B1 * | 4/1999 |
| EP | 0-574-224 B1 * | 2/2000 |
| EP | 1-515-238 A2 * | 3/2005 |

OTHER PUBLICATIONS

Miyabe, Yoshiyuki, et al., "Structured Document Preparation System: AutoLayouter", TUGboat, vol. 11, No. 3, © 1990, pp. 353-358.*

Gaylord, Harry E., "Character Representation", Computers and the Humanities, vol. 29, No. 1, © 1995, pp. 51-73.*

Kakugawa, Hirotsugu, "A Device-Independent DVI Interpreter Library for Various Output Devices", TUGboat, vol. 21, No. 3, © 2000, pp. 243-249.*

* cited by examiner

AUTO-ACTIVATION OF FONTS

CROSS-REFERENCE TO RELATED APPLICATIONS

This application is related to, and claims the benefits of, U.S. Provisional Patent Application No. 60/943,046, filed on Jun. 9, 2007 entitled "AUTOMATIC FONT ACTIVATION," Julio Gonzalez et al. which is hereby incorporated herein by reference.

FIELD OF INVENTION

The present invention relates generally to font management. More particularly, this invention relates to automatic font activation.

BACKGROUND

As the number of available fonts rapidly increases, it has become harder and harder to properly manage fonts for electronic documents. Typically, an electronic document is assigned with fixed fonts in a software application. Later, in the process of editing and/or printing, these fonts are requested from an operating environment and applied to the electronic document. However, a particular font may not be available when requested. Usually, a user is required to perform a time consuming yet error prone task to locate and install the requested font.

Alternatively, a user may rely on font management software to help install proper fonts. Often times, a user is still required to input detailed specifications about requested fonts for such software to work properly. However, the vast majority of users may not be knowledgeable about font specifications such as where a font library is located, what ownership of the font library is associated with, and/or where a font should be installed etc.

In one embodiment, an electronic document, such as a word processing file which may have been just downloaded or otherwise received by a system, may have font information associated with the document, and a search for fonts required by the document, as indicated by the font information, may occur automatically in response to, for example, receiving the document or opening the document. The system performs the search by searching on local and/or remote storage devices for the desired font resources, such as those specified by the font information. After finding those resources, the system automatically (e.g. without user interaction) loads and/or activates those font resources.

Therefore, current font management mechanisms do not provide a proper solution for handling a large number of fonts.

SUMMARY OF THE DESCRIPTION

An embodiment of the present invention includes a method and apparatus that search for font data associated with an electronic document in response to a font request. A font search is automatically activated when a requested font is not yet registered in a system. As a result of the font search, a requested font may be installed into a system. If a font search cannot locate a requested font in local storages and remote systems, a replacement for the requested font is selected from registered fonts. A replacement font may be one of the registered fonts most similar to the requested font according to a similarity measurement based on font attributes.

Other features of the present invention will be apparent from the accompanying drawings and from the detailed description that follows.

DETAILED DESCRIPTIONS

A method and an apparatus for automatic font activation are described herein. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The term "host" and the term "device" are intended to refer generally to data processing systems rather than specifically to a particular form factor for the host versus a form factor for the device.

In one embodiment, auto activation of fonts may install requested fonts on demand without user intervention. A requested font associated with an electronic document may be located automatically from local files or remote systems. Multiple systems may interact with each other over a network to locate a requested font. In one embodiment, a requested font may be activated in the background unnoticed to a user. Activating a font may include reallocating storage space associated with a predetermined location within system storage constraints. In one embodiment, when a requested font cannot be located either locally or remotely, a replacement font most similar to the requested font may be selected automatically from existing (or registered) fonts. Similarities to a requested font may be compared according to a similarity measure based on font attributes.

Figure 1:
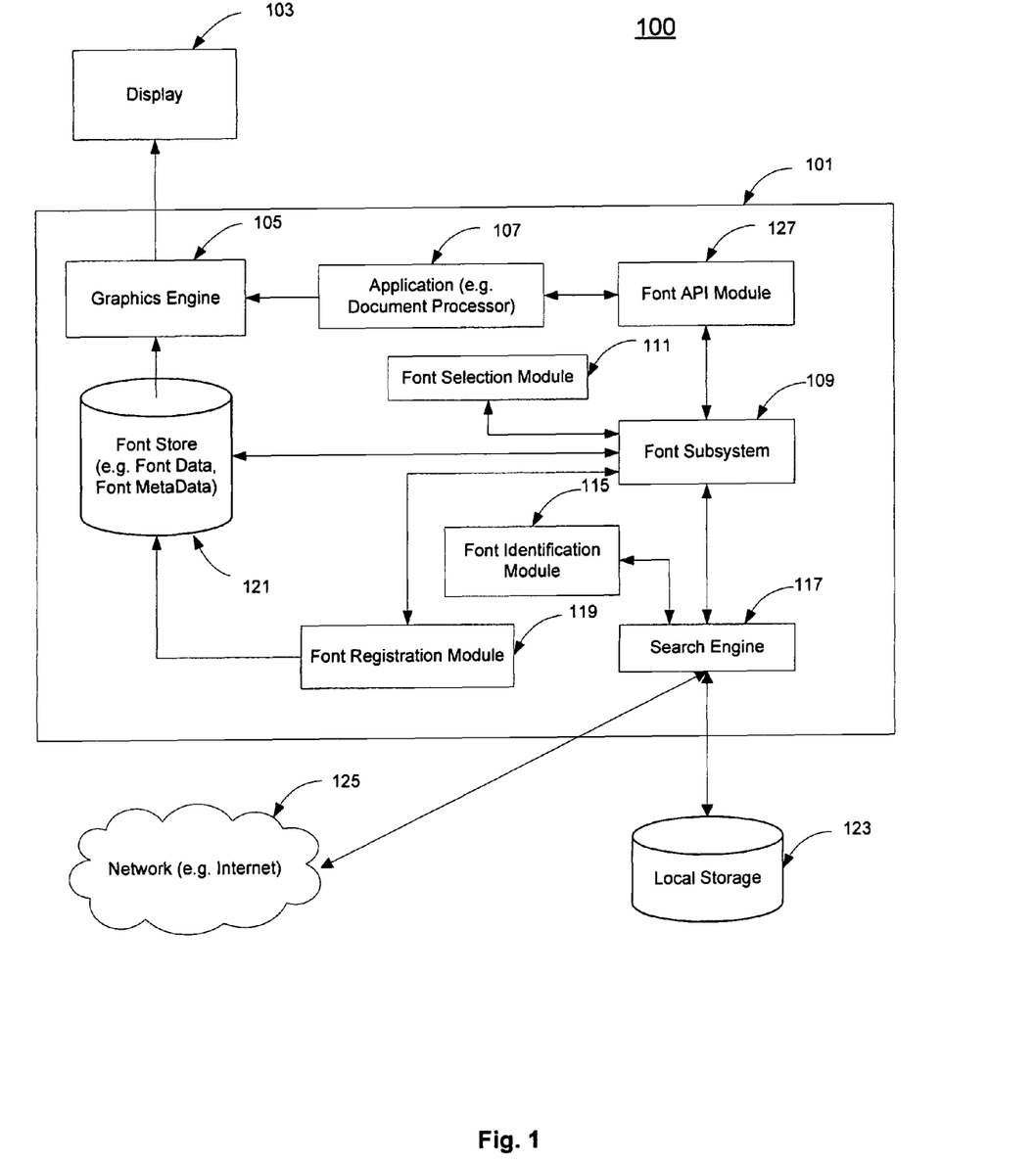
FIG. 1 is a block diagram illustrating one embodiment of a system to automatically search and/or activate fonts.

FIG. 1 is a block diagram illustrating one embodiment of a system to automatically search and/or activate fonts. System 101 may be a part of an operating system for a machine such as a digital device or a computer system. In one embodiment, an application 107, e.g. a document application, may send a request to a font API module 127 for a specific font to display a document through a graphics engine 105 on a display 103. A font may include font data, such as glyph data and/or font tables, to graphically represent text in an electronic document. Font data may include font attributes, such as characteristics data and/or font identifiers. Font attributes may include font metadata based on unified scale, such as how bold, how cursive, or how italic a font is compared with other fonts or other attributes of font. In one embodiment, font data and font metadata may be stored in separate files.

A font API module 127 may retrieve a pointer to font data associated with a font via a font subsystem 109. A font subsystem may reside inside a graphics layer of an operating system. In one embodiment, font data for a font may be available from a font store 121 after the font has been registered in a system, such as system 101. A font store 121 may include a font database such as, for example, Apple's Spotlight database. A font subsystem 109 may query a font store 121 for an entry corresponding to a requested font. An entry for a font in a font store 121 may be associated with corresponding font attributes, such as metadata for the font. If an entry for a font does not include a pointer to font data, the font is not registered with a corresponding system. A font not registered may still be associated with corresponding font metadata in a font store 121.

In one embodiment, a font subsystem 109 may search for a font via a search engine 117 if the font is found not registered. A font search engine 117 may crawl through local storages 123, such as locally coupled hard disks, CDs, and/or storage plug-ins. In addition, a font search engine 117 may search remote storages or devices coupled over a network 125, such as Internet. In one embodiment, a font search engine 117 may determine whether a file opened during a font search is a font file according to a font identification module 115. A font identification module 115 may identify font data and/or font attributes in a file by matching file contents with font identifiers (names) and/or predetermined font storage formats. When a requested font is located, a font subsystem 109 may register the located font through a font registration module 119. In one embodiment, a font registration module 119 may update a font store 121 including, for example, allocating required storage space, storing located font data and updating a font database in the font store 121. In one embodiment, a font registration module 119 may remove an already registered font to make space to register a new font according to a priority, such as, for example, font usage frequency. If no matched fonts are found by a font search engine 117, a font subsystem 109 may determine a replacement font selected from registered fonts through a font selection module 111. In one embodiment, a font selection module may measure a similarity between a requested font and a registered font based on font attributes, such as font metadata, retrieved from a font store 121. A replacement font may be selected from a set of registered fonts according to associated similarity measurements.

Figure 2:
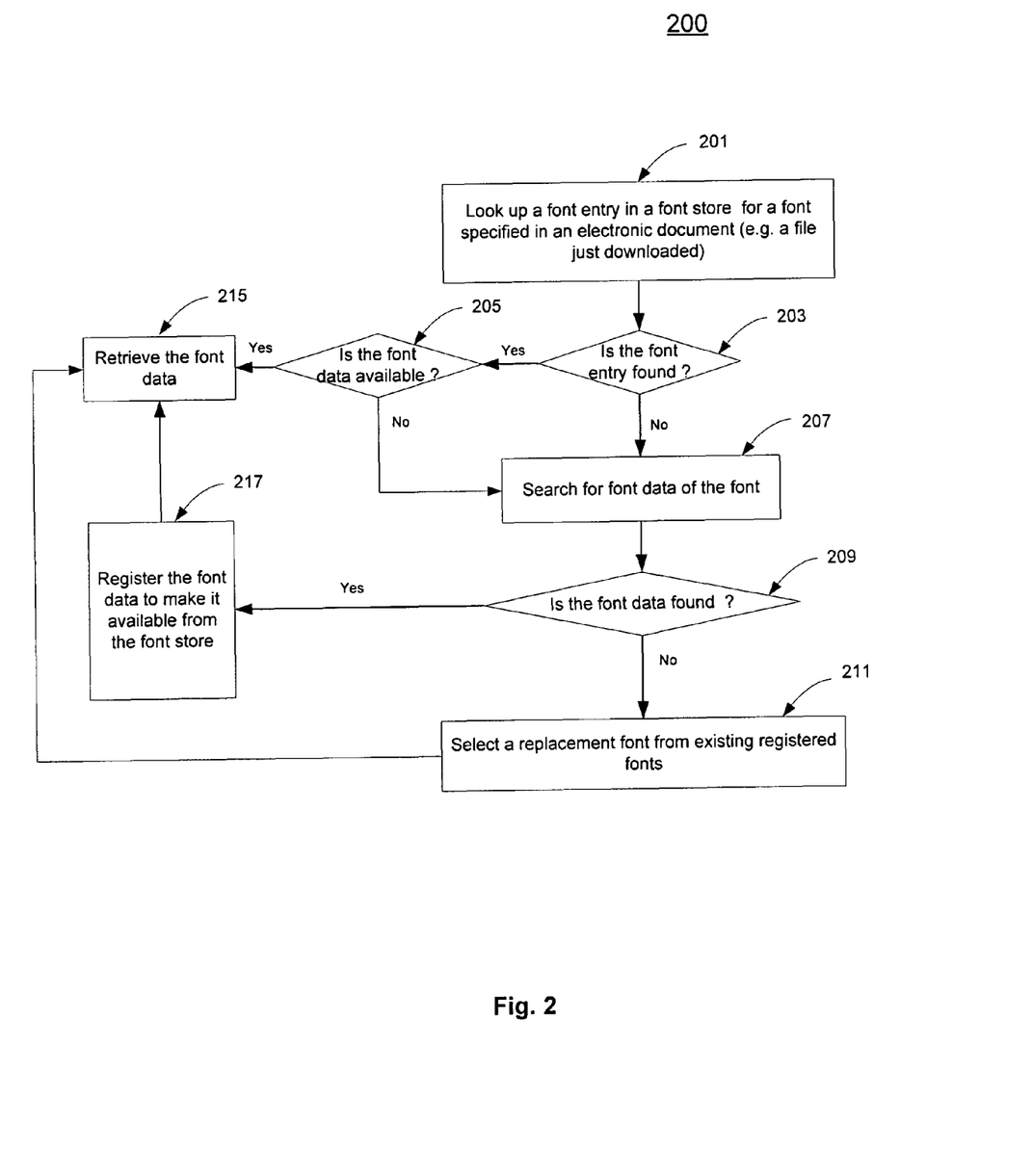
FIG. 2 is a flow diagram illustrating one embodiment of a process to automatically search and/or activate fonts.

FIG. 2 is a flow diagram illustrating one embodiment of a process to automatically search and/or activate fonts. For example, process 200 may be performed by system 100 of FIG. 1. In one embodiment, at block 201, the processing logic of process 200 may look up a font entry in a font store, such as font store 121 of FIG. 1, for a font specified in an electronic document, such as a file just downloaded. A font entry may be a table in a font database. In another embodiment, the processing logic of process 200 may perform a font look up at block 201 in response to a font request received from a graphics system to display character data for an electronic document. The processing logic of process 200 may determine if the specified font has an entry from a font database at block 203. If no such entry is found, in one embodiment, the processing logic of process 200 may proceed to search for the font at block 207. If a font entry is found, the processing logic of process 200 may determine if a corresponding font data is available (i.e. registered) at block 205. If no such font data is available, at block 207, the processing logic of process 200 may search local storages and/or remote systems for the corresponding font data.

In an aspect, the processing logic of process 200 may perform a search with a limitation associated with an electronic document and/or a specified font at block 201. For example, the processing logic of process 200 may determine not to perform a font search or to perform only a limited font search according to a setting associated with the owner of an electronic document. In another aspect, the processing logic of process 200 may determine whether or not to perform a font search based on a usage history, such as, for example, a feature to prompt a user to purchase an automatically activated font before proceeding to locate the font.

If font data is located during a search, at block 217, the processing logic of process 200 may register the font data into a font store, such as font store 121 of FIG. 1. In one embodiment, a font may be registered by storing associated font data in a font store with a corresponding font entry. If no corresponding font data is located at block 207, the processing logic of process 200 may select a replacement font for the specified font at block 211. In one embodiment, the processing logic of process 200 may compare a specified font with multiple registered fonts to select one registered font as a replacement font most similar to the specified font. The processing logic of process 200 may conclude by retrieving a registered font data for the specified font at block 215.

Figure 3:
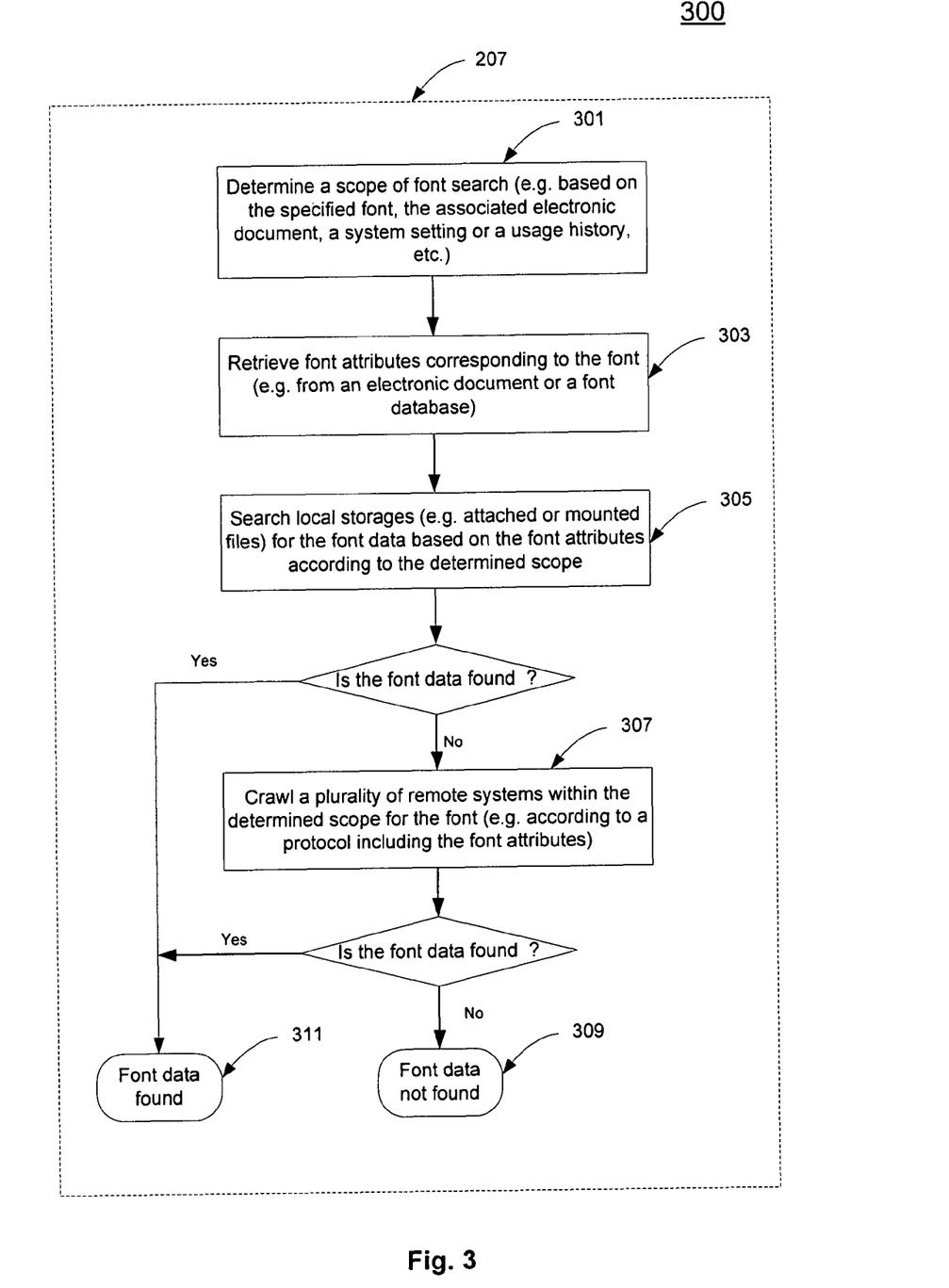
FIG. 3 is a flow diagram illustrating one embodiment of a process to search for a font.

FIG. 3 is a flow diagram illustrating one embodiment of a process to search for a font. For example, process 300 may be performed according to process 200 at block 207 of FIG. 2. In one embodiment, the processing logic of process 300 may determine a scope of font search at block 301. A search scope may specify a limitation how a search for a font should be conducted. In one embodiment, a search scope may prohibit a font search to be performed. In another embodiment, a search scope may limit a search to only local storages such as local and/or remotely mounted files systems. A search scope may include one or more remote locations where search for a particular font is allowed. In one embodiment, a search scope may be determined based on an associated electronic document, a particular font specified or user and/or system settings. For example, a user may purchase a right to use a certain font for a certain period of time (e.g. usage history). The processing logic of process 300 may determine a specified font at block 301 is allowed according to system privilege settings to search a maximum possible scope for the specified font. A search scope may be associated with a limitation as a black list including remote locations not allowed for a font search.

At block 303, in one embodiment, the processing logic of process 300 may retrieve font attributes corresponding to the specified font from a font store, such as a font database in a font store 121 of FIG. 1. In another embodiment, font attributes may be available directly from an electronic document associated with a specified font. At block 305, the processing logic may search local storages for a specified font. A local storage search may include files systems specified according to a search scope determined at block 301. In one embodiment, the processing logic of process 300 may open a file in a file system to determine whether a file includes a specified font according to file formats, characteristics of the content inside a file, and/or matching font names, according to font attributes retrieved at block 303. Font files may be identified based on predetermined font file formats, such as, for example, font format for TrueType Font.

At block 307, according to one embodiment, if a specified font is not found from local storages, the processing logic of process 300 may crawl multiple remote systems to search for the font according to a determined scope. The processing logic of process 300 may send a request for a specified font to a remote system. Based on a response received from a remote system, in one embodiment, the processing logic of process 300 may subsequently send additional requests for the specified font to other remote systems. The processing logic of process 300 may determine whether a remote destination system is within a search scope prior to sending a font search request. In one embodiment, the processing logic of process 300 may send a request for a specified font based on a protocol including font attributes, such as, for example, font names. The processing logic of process 300 may receive a response including complete font data in response to a font search request. In one embodiment, the processing logic of process 300 may receive only partial font data, such as font metadata for a font search request. If a specified font is found with complete font data, the processing logic of process 300 continues at block 311, otherwise at block 309.

Figure 4:
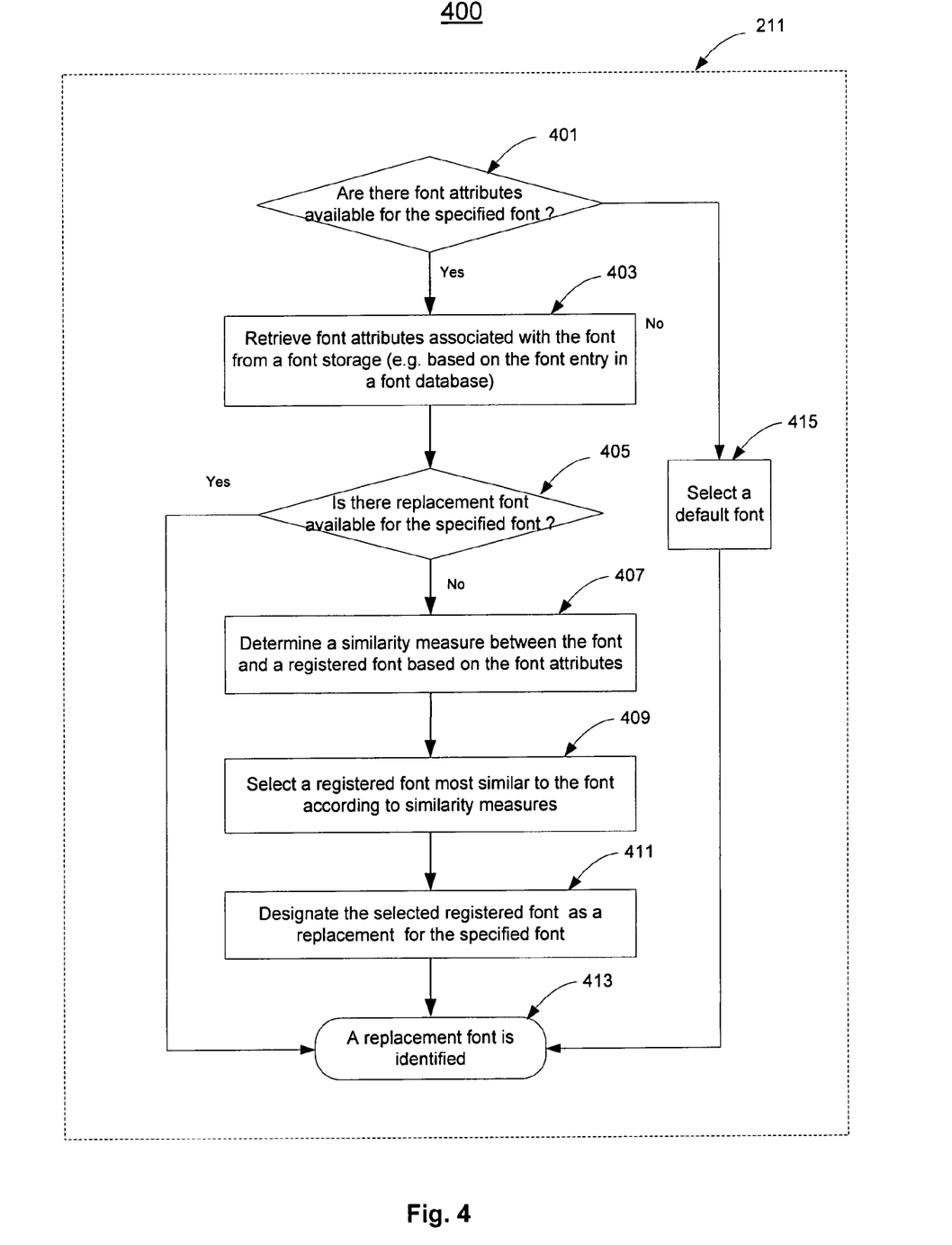
FIG. 4 is a flow diagram illustrating one embodiment of a process to determine a replacement for a font.

FIG. 4 is a flow diagram illustrating one embodiment of a process to determine a replacement for a font. For example, process 400 may be performed according to process 200 at block 211 of FIG. 2. In one embodiment, process 400 may be performed when a specified font cannot be located either locally or remotely. The processing logic of process 400 may determine if there are font attributes available for the specified font at block 401, for example, based on a font database in a font store, such as font store 121 of FIG. 1. In one embodiment, a font store may include font attributes for a font, such as font metadata, but without the corresponding font data, such as font glyph data. If font attributes associated with a specified font are not available, at block 415, the processing logic of process 400 may select a default font to replace the specified font. In one embodiment, a default font may be predetermined according to a system setting. Otherwise, the processing logic of process 400 may retrieve font attributes associated with a specified font from a font store at block 403.

In one embodiment, at block 405, the processing logic of process 400 may determine if there is already a replacement font designated for the specified font at block 401. A replacement font for a specified font may have been identified in a prior font search during auto activation of the specified font. In one embodiment, designation of a replacement font may be revoked if changes are made to registered fonts, such as, for example, installing a new font or removing an existing font, etc. If an existing replacement font for a specified font is available, the existing replacement font may be identified to replace the specified font at block 413.

Otherwise, in one embodiment, the processing logic of process 400 may determine a similarity measure between a specified font and a registered font to select a replacement font at block 407. Similarity between separate fonts may be measured based on associated font attributes, such as font attributes retrieved at block 403, including, for example, font metadata. The processing logic of process 400 may measure similarities between a specified font and multiple registered fonts. At block 409, the processing logic of process 400 may select a registered font most similar to a specified font. In another embodiment, similarity to a specified font may be measured against fonts associated with font attributes stored in a system, regardless whether the corresponding font data are registered or not. The processing logic of process 400 may compare similarity measures and select a font associated with, for example, the maximum similarity value among measured similarities. In one embodiment, if a selected font, most similar to a specified font, is not registered, the selected font may be automatically activated based on a font search. At block 411, the processing logic of process 400 may designate a selected registered font as a replacement font for the specified font. In one embodiment, the processing logic of process 400 may update a font store, such as font store 121 of FIG. 1, to indicate a registered font selected as a replacement for a specified font. The selected registered font may be identified as a replacement font at block 413. In one embodiment, a request for a specified font may be substituted by a separate request for a replacement font designated for the specified font.

Figure 5:
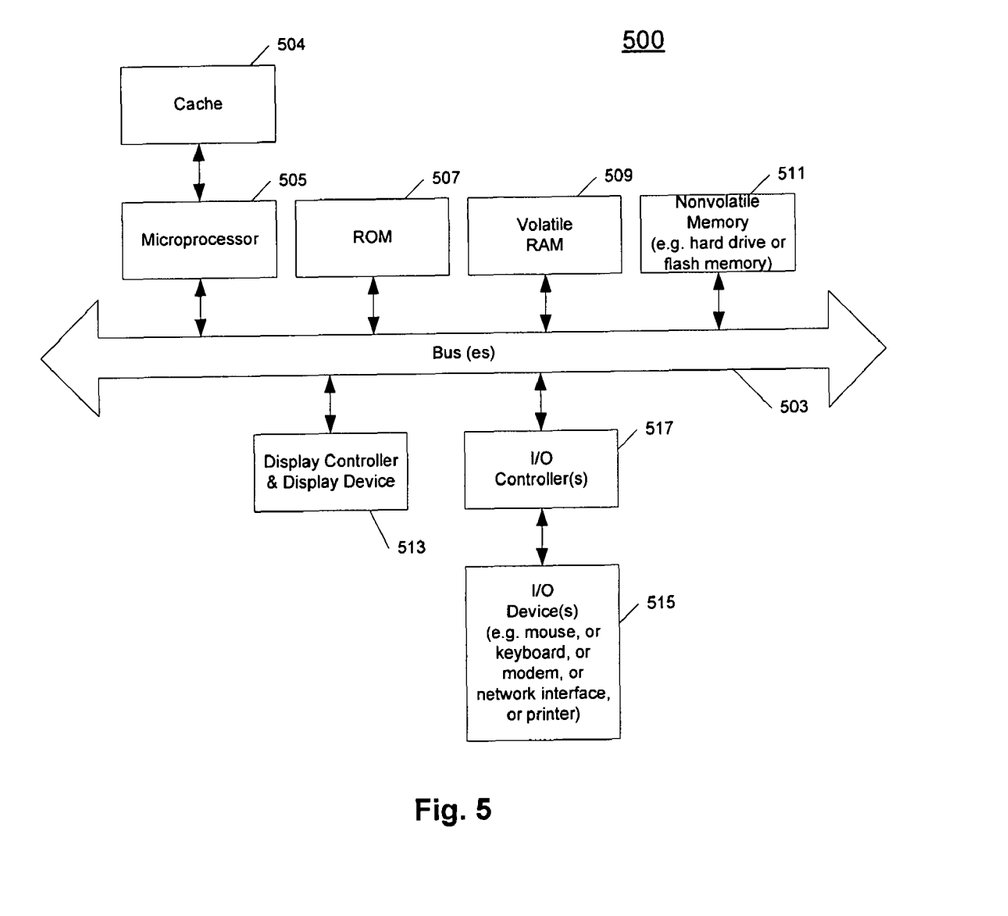
FIG. 5 illustrates one example of a typical computer system which may be used in conjunction with the embodiments described herein

FIG. 5 shows one example of a data processing system such as a computer system, which may be used with one embodiment the present invention. For example, the system 500 may be implemented as a part of the system shown in FIG. 1. Note that while FIG. 5 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention.

As shown in FIG. 5, the computer system 501, which is a form of a data processing system, includes a bus 503 which is coupled to a microprocessor(s) 505 and a ROM (Read Only Memory) 507 and volatile RAM 509 and a non-volatile memory 511. The microprocessor 503 may retrieve the instructions from the memories 507, 509, 511 and execute the instructions to perform operations described above. The bus 503 interconnects these various components together and also interconnects these components 505, 507, 509, and 511 to a display controller and display device 513 and to peripheral devices such as input/output (I/O) devices which may be mice, keyboards, modems, network interfaces, printers and other devices which are well known in the art. Typically, the input/output devices 515 are coupled to the system through input/output controllers 517. The volatile RAM (Random Access Memory) 509 is typically implemented as dynamic RAM (DRAM) which requires power continually in order to refresh or maintain the data in the memory.

The mass storage 511 is typically a magnetic hard drive or a magnetic optical drive or an optical drive or a DVD RAM or a flash memory or other types of memory systems which maintain data (e.g. large amounts of data) even after power is removed from the system. Typically, the mass storage 511 will also be a random access memory although this is not required. While FIG. 5 shows that the mass storage 511 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface or wireless networking interface. The bus 503 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention

What is claimed is:

1. A computer-implemented method, the method comprising:
    determining, in response to a request for a font associated with a document, whether the font is available in a system having a maximum search scope for the font;
    if the font is not available in the system, determining a search scope for the font, the search scope specifying one or more storage locations within the maximum search scope, at least one storage location of the maximum search scope is prohibited in the search scope;
    searching for font data of the font limited by the search scope; and
    registering the font data into the system if the font data is located within the search scope in order to allow retrieval of the registered font data from the system for displaying the document.

2. The method of claim 1, wherein registering the font data comprises:
    storing the font data in a local storage of the system; and
    updating the font entry with location information of the font data in the local storage.

3. The method of claim 2, further comprising:
    setting up a network connection to a remote system over a network; and
    sending a search request to the remote system for the font data according to a search protocol over the network connection.

4. The method of claim 3, wherein sending the search request comprises:
    setting up a separate network connection to a separate remote system according to a response to the search request.

5. The method of claim 3, wherein the search protocol includes font attributes associated with the font and wherein the font attributes are stored in the system according to a font entry associated with the font.

6. The method of claim 5, wherein the search scope includes a black list specifying locations where the search is not allowed.

7. The method of claim 1, wherein the searching comprises:

determining if the font data is already registered in the system; and searching a local storage in the system for the font data if the font data is determined not yet registered.

8. The method of claim 1, further comprising:
detecting if a usage condition is satisfied; and
sending an alert message if the usage condition is not satisfied,
wherein the search depends on when the usage condition is satisfied.

9. The method of claim 1, further comprising retrieving the registered font data, wherein retrieving the registered font data comprises:
determining a similarity measure between the font and a separate font; and
selecting the separate font from among a plurality of fonts in the system as most similar to the font based on the similarity measure.

10. The method of claim 9, wherein the similarity measure is determined according to font attributes associated with the font, the font attribute being stored in the system separate from the font data.

11. The method of claim 9, wherein the plurality of fonts have been registered in the system and wherein the separate font is associated with the registered font data.

12. The method of claim 9, wherein the registered font data is associated with the separate font and wherein the separate font is not registered in the system, further comprising:
searching for the registered font data according to the search scope.

13. A computer readable storage medium having instructions stored therein, which when executed by a processor, cause a computer to perform a method, the method comprising:
determining, in response to a request for a font associated with a document, whether the font is available in a system having a maximum search scope for the font;
if the font is not available in the system, determining a search scope for the font, the search scope including specifying one or more storage locations within the maximum search scope, at least one storage location of the maximum search scope is prohibited in the search scope;
searching for font data of the font limited by the search scope; and
registering the font data into the system if the font data is located within the search scope in order to allow retrieval of the registered font data from the system for displaying the document.

14. The computer readable storage medium of claim 13, wherein registering the font data comprises: storing the font data in a local storage of the system; and updating the font entry with location information of the font data in the local storage.

15. The computer readable storage medium of claim 14, further comprising: setting up a network connection to a remote system over a network; and sending a search request to the remote system for the font data according to a search protocol over the network connection.

16. The computer readable storage medium of claim 15, wherein sending the search request comprises: setting up a separate network connection to a separate remote system according to a response to the search request.

17. The computer readable storage medium of claim 16, wherein the search protocol includes font attributes associated with the font and wherein the font attributes are stored in the system according to a font entry associated with the font.

18. The computer readable storage medium of claim 17, wherein the search scope includes a black list specifying locations where the search is not allowed.

19. The computer readable storage medium of claim 13, wherein the searching comprises: determining if the font data is already registered in the system; and searching a local storage in the system for the font data if the font data is determined not yet registered.

20. The computer readable storage medium of claim 13, further comprising: detecting if a usage condition is satisfied; and sending an alert message if the usage condition is not satisfied, wherein the search depends on when the usage condition is satisfied.

21. The computer readable storage medium of claim 13, further comprising retrieving the registered font data, wherein retrieving the registered font data comprises: determining a similarity measure between the font and a separate font; and selecting the separate font from among a plurality of fonts in the system as most similar to the font based on the similarity measure.

22. The computer readable storage medium of claim 21, wherein the similarity measure is determined according to font attributes associated with the font, the font attribute being stored in the system separate from the font data.

23. The computer readable storage medium of claim 21, wherein the plurality of fonts have been registered in the system and wherein the separate font is associated with the registered font data.

24. The computer readable storage medium of claim 21, wherein the registered font data is associated with the separate font and wherein the separate font is not registered in the system, further comprising: searching for the registered font data according to the search scope.

25. A machine for a data-processing system comprising:
a display device;
a memory storing executable instructions; and
a processor coupled to the display device and the memory, the processor executing the executable instructions from the memory, wherein the processor is configured to
determine in response to a request for a font associated with a document, whether the font is available in a system having a maximum search scope for the font,
if the font is not available in the system, determine a search scope for the font, the search scope specifying one or more storage locations within the maximum search scope, at least one storage location of the maximum search scope is prohibited in the search scope,
search for font data of the font limited by the search scope, and
register the font data into the system if the font data is located within the search scope in order to allow retrieval of the registered font data from the system for displaying the document via the display device.

* * * * *